US012570464B2

(12) United States Patent
Wente et al.

(10) Patent No.: US 12,570,464 B2
(45) Date of Patent: Mar. 10, 2026

(54) REFUSE VEHICLE WITH FRAME RAIL SERVICE LIFT

(71) Applicant: Oshkosh Corporation, Oshkosh, WI (US)

(72) Inventors: Derek Wente, Oshkosh, WI (US); Jacob Wallin, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 368 days.

(21) Appl. No.: 18/143,183

(22) Filed: May 4, 2023

(65) Prior Publication Data

US 2023/0356934 A1     Nov. 9, 2023

Related U.S. Application Data

(60) Provisional application No. 63/338,515, filed on May 5, 2022.

(51) Int. Cl.
*B65F 3/26*          (2006.01)
*B60P 1/16*          (2006.01)
*B65F 3/00*          (2006.01)
*B65F 3/20*          (2006.01)

(52) U.S. Cl.
CPC .................................... B65F 3/26 (2013.01); B60P 1/16 (2013.01); B65F 3/201 (2013.01); B65F 2003/006 (2013.01)

(58) Field of Classification Search
CPC .... B60P 1/16; B65F 3/201; B65F 3/26; B65F 2003/006
USPC ...................................... 298/22 R; 414/525.6
See application file for complete search history.

(56) References Cited

U.S. PATENT DOCUMENTS

| | | | | | |
|---|---|---|---|---|---|
| 3,559,830 | A | * | 2/1971 | Toppins .................... | B65F 3/26 414/525.5 |
| 3,647,098 | A | * | 3/1972 | Smith ..................... | B65F 3/201 298/17.5 |
| 3,827,753 | A | * | 8/1974 | Pitts ........................ | B60P 1/286 414/517 |
| 4,067,464 | A | * | 1/1978 | Parks ....................... | B65F 3/28 414/346 |
| 5,033,794 | A | * | 7/1991 | Vick ......................... | B60P 1/16 298/22 R |
| 5,765,985 | A | * | 6/1998 | Johnson .................. | B65F 3/201 414/525.6 |
| 5,772,389 | A | * | 6/1998 | Feller ........................ | B60P 1/42 414/469 |
| 5,785,487 | A | * | 7/1998 | McNeilus ................. | B65F 3/28 414/525.6 |

(Continued)

FOREIGN PATENT DOCUMENTS

| | | | | |
|---|---|---|---|---|
| EP | 0 488 162 A2 | 6/1992 | | |
| FR | 2781213 A1 | * | 1/2000 | ................ B65F 3/26 |

OTHER PUBLICATIONS

Office Action issued in connection with Canadian Appl. No. 3198986 dated Dec. 23, 2024.

*Primary Examiner* — James Keenan
(74) *Attorney, Agent, or Firm* — Foley & Lardner LLP

(57)          ABSTRACT

A vehicle includes a chassis, a body pivotally coupled to the chassis by a pivot assembly, and a lift actuator. The lift actuator includes a base portion positioned within the body and an actuator rod extending from the body and coupled to the chassis, such that the lift actuator is configured to lift and pivot the body relative to the chassis.

14 Claims, 6 Drawing Sheets

(56)     References Cited

U.S. PATENT DOCUMENTS

| | | | |
|---|---|---|---|
| 7,357,457 B2 * | 4/2008 | Thomas | B60P 1/28 |
| | | | 410/80 |
| 11,001,135 B2 * | 5/2021 | Yakes | B60K 6/46 |
| 2005/0253445 A1 * | 11/2005 | Beiler | B65F 3/00 |
| | | | 298/22 C |
| 2016/0257236 A1 | 9/2016 | Baldys et al. | |
| 2020/0346547 A1 | 11/2020 | Rocholl et al. | |
| 2020/0346556 A1 | 11/2020 | Rocholl et al. | |
| 2020/0346557 A1 | 11/2020 | Rocholl et al. | |
| 2020/0346854 A1 | 11/2020 | Rocholl et al. | |
| 2020/0346855 A1 | 11/2020 | Rocholl et al. | |
| 2020/0346856 A1 | 11/2020 | Rocholl et al. | |
| 2020/0346857 A1 | 11/2020 | Rocholl et al. | |
| 2020/0346861 A1 | 11/2020 | Rocholl et al. | |
| 2020/0346862 A1 | 11/2020 | Rocholl et al. | |
| 2020/0347659 A1 | 11/2020 | Rocholl et al. | |
| 2020/0347661 A1 | 11/2020 | Rocholl et al. | |
| 2020/0347857 A1 | 11/2020 | Clifton et al. | |
| 2020/0398670 A1 | 12/2020 | Rocholl et al. | |
| 2020/0398695 A1 | 12/2020 | Rocholl et al. | |
| 2020/0398697 A1 | 12/2020 | Rocholl et al. | |
| 2020/0399057 A1 | 12/2020 | Rocholl et al. | |
| 2021/0031611 A1 | 2/2021 | Yakes et al. | |
| 2021/0031612 A1 | 2/2021 | Yakes et al. | |
| 2021/0221216 A1 | 7/2021 | Yakes et al. | |
| 2021/0229908 A1 | 7/2021 | Rocholl et al. | |
| 2021/0252995 A1 | 8/2021 | Rocholl et al. | |
| 2021/0323436 A1 | 10/2021 | Rocholl et al. | |
| 2021/0323437 A1 | 10/2021 | Rocholl et al. | |
| 2021/0323438 A1 | 10/2021 | Rocholl et al. | |
| 2021/0324880 A1 | 10/2021 | Wente et al. | |
| 2021/0339632 A1 | 11/2021 | Rocholl et al. | |
| 2021/0339648 A1 | 11/2021 | Koga et al. | |
| 2021/0396251 A1 | 12/2021 | Clifton et al. | |
| 2022/0009338 A1 | 1/2022 | Yakes et al. | |
| 2022/0096884 A1 | 3/2022 | Koga et al. | |
| 2022/0097527 A1 | 3/2022 | Koga et al. | |
| 2022/0097555 A1 | 3/2022 | Koga et al. | |
| 2022/0097556 A1 | 3/2022 | Koga et al. | |
| 2022/0097633 A1 | 3/2022 | Koga et al. | |
| 2022/0097961 A1 | 3/2022 | Koga et al. | |
| 2022/0097962 A1 | 3/2022 | Koga et al. | |
| 2022/0097963 A1 | 3/2022 | Koga et al. | |
| 2022/0097964 A1 | 3/2022 | Koga et al. | |
| 2022/0099723 A1 | 3/2022 | Koga et al. | |
| 2022/0105827 A1 | 4/2022 | Rocholl et al. | |
| 2022/0169444 A1 | 6/2022 | Rocholl et al. | |
| 2022/0185582 A1 | 6/2022 | Koga et al. | |
| 2022/0219896 A1 | 7/2022 | Gary et al. | |
| 2022/0258965 A1 | 8/2022 | Kappers et al. | |
| 2022/0258967 A1 | 8/2022 | Kappers et al. | |
| 2022/0267090 A1 | 8/2022 | Rocholl et al. | |
| 2022/0307312 A1 | 9/2022 | Rocholl et al. | |
| 2022/0340359 A1 | 10/2022 | Rocholl et al. | |
| 2023/0039772 A1 | 2/2023 | Rocholl et al. | |
| 2023/0039974 A1 | 2/2023 | Rocholl et al. | |
| 2023/0042649 A1 | 2/2023 | Koga et al. | |
| 2023/0045720 A1 | 2/2023 | Rocholl et al. | |
| 2023/0047275 A1 | 2/2023 | Rocholl et al. | |
| 2023/0053238 A1 | 2/2023 | Koga et al. | |
| 2023/0089417 A1 | 3/2023 | Koga et al. | |
| 2023/0117427 A1 | 4/2023 | Turner et al. | |
| 2023/0120042 A1 | 4/2023 | Turner et al. | |
| 2023/0125077 A1 | 4/2023 | Gary et al. | |
| 2023/0173945 A1 | 6/2023 | Rocholl et al. | |
| 2023/0202301 A1 | 6/2023 | Rocholl et al. | |
| 2023/0202340 A1 | 6/2023 | Koga et al. | |

* cited by examiner

REFUSE VEHICLE WITH FRAME RAIL SERVICE LIFT

CROSS-REFERENCE TO RELATED PATENT APPLICATIONS

The present application claims the benefit of and priority to U.S. Provisional Patent Application No. 63/338,515, filed on May 5, 2022, the entire disclosure of which is incorporated by reference herein.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One implementation of the present disclosure relates to a vehicle including a chassis, a body pivotally coupled to the chassis by a pivot assembly, and a lift actuator. The lift actuator includes a base portion positioned within the body and an actuator rod extending from the body and coupled to the chassis, such that the lift actuator is configured to lift and pivot the body relative to the chassis.

Another implementation of the present disclosure relates to a refuse vehicle including a chassis and a body. The body includes hopper volume configured to receive refuse via an upper opening and a storage volume configured to store the refuse. The body is pivotally coupled to the chassis by a pivot assembly. The refuse vehicle further includes a lift actuator including a base portion positioned within the hopper volume and an actuator rod extending from the hopper volume and coupled to the chassis, such that the lift actuator is configured to lift and pivot the body relative to the chassis.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Overview

Figure 1:
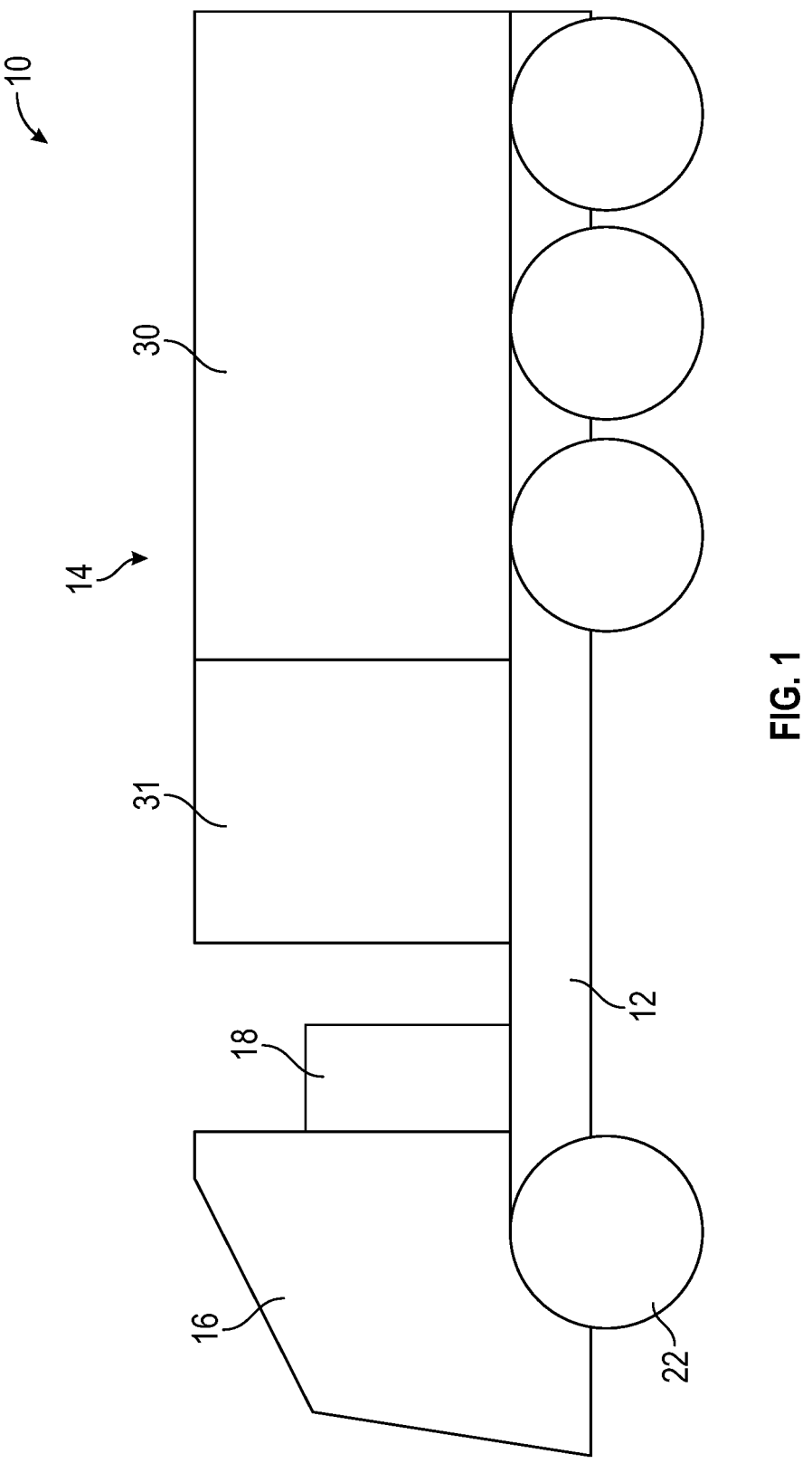
FIG. 1 is a side view of a refuse vehicle, according to some embodiments.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

In various refuse vehicle systems, it may be desirable to lift a body of the refuse vehicle relative to a chassis of the refuse vehicle below, and in some cases supporting, the body. For example, lifting the body of the refuse vehicle relative to the chassis may enhance access to various components of the body, as well as components of the refuse vehicle stored and/or supported within the chassis. In some systems, various service lifts may be used to lift the body relative to the chassis as such. However, in some systems, service lifts may typically be coupled to an outer portion of the chassis, therefore consuming valuable space on the chassis that may be otherwise used to store components of the refuse vehicle, such as batteries, fuel tanks, accessories, and so on. Further, coupling service lifts to an outer portion of the chassis may require various mounts coupled alongside the chassis to support such service lifts, further consuming space. Therefore, a service lift operable to lift the body that does not consume such valuable space on the chassis may be desirable. According to an exemplary embodiment, a service lift for a refuse vehicle is disclosed herein that is configured to interface with a more desirable portion of the chassis, therefore consuming an improved amount of space. As an example, the service lift may be configured to interface with an upper surface of the chassis (such as an upper surface of one or more frame rails forming the chassis). As another example, the service lift may be configured to interface with a support extending between the frame rails forming the chassis. Such arrangements may not only allow for extra space alongside the chassis otherwise consumed by service lifts themselves, but further eliminate the need for mounts alongside the chassis to support service lifts, thus providing valuable space alongside the chassis for storage of other components of the refuse vehicle. The electrical components of the body may receive power from a power storage and/or generation system supported within an interior of the chassis below the body. The service lift may be coupled to the body and the chassis such that the service lift exerts a downward force on an upper surface of the chassis and, due to a rigid coupling between a portion of the service lift and the body, the service lift may be operable to lift the body. In various exemplary embodiments, at least a portion of the service lift is positioned within the body, specifically within a cavity formed by components of a compactor of the refuse vehicle housed by the body, therefore optimizing allocations of space on the refuse vehicle.

Referring now to FIG. 1, a vehicle is shown as refuse vehicle 10 (e.g., a garbage truck, a waste collection truck, a sanitation truck, a recycling truck, etc.). As shown in FIG. 1, the refuse vehicle 10 includes a chassis, shown as frame 12, a body assembly, shown as body 14, coupled to (and in some cases, supported by) the frame 12 (e.g., at a rear end thereof, etc.), and a cab, shown as cab 16, coupled to the frame 12 (e.g., at a front end thereof, etc.). The cab 16 may include various components to facilitate operation of the refuse vehicle 10 by an operator (e.g., a seat, a steering wheel, actuator controls, a user interface, switches, buttons, dials, etc.). In some embodiments, the vehicle 10 includes a prime mover, shown as electric motor 18. In other embodiments, the prime mover is or includes an internal combustion engine. According to the exemplary embodiment shown in FIG. 1, the electric motor 18 is coupled to the frame 12 at a position behind the cab 16 and in front of the body 14. The electric motor 18 is configured to provide power to a plurality of tractive elements, shown as wheels 22 (e.g., via a drive shaft, axles, etc.). In other embodiments, the electric motor 18 is otherwise positioned and/or the refuse vehicle 10 includes a plurality of electric motors to facilitate independently driving one or more of the wheels 22. In still other embodiments, the electric motor 18 or a secondary electric motor is coupled to and configured to drive a hydraulic system that powers hydraulic actuators.

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 may be a refuse compartment and include a collection chamber (e.g., hopper, etc.). Loose refuse may be placed into the body 14 where it may thereafter be compacted (e.g., by a packer system, etc.). Thus, in some embodiments, the body may define a hopper volume 31 and storage volume 30. In this regard, refuse may be initially loaded into the hopper volume 31 and later compacted into the storage volume 30, as depicted in greater detail below with reference to FIG. 4. As shown, the hopper volume 31 is positioned between the storage volume 30 and the cab 16 (e.g., refuse is loaded into a portion of the body 14 behind the cab 16 and stored in a portion toward the front of the body 14). In other embodiments, the storage volume 30 may be positioned between the hopper volume 31 and the cab 16. Thus, the body 14 may provide temporary storage for refuse during transport to a waste disposal site and/or a recycling facility. In some embodiments, at least a portion of the body 14 and the refuse compartment 30 extend above or in front of the cab 16.

In some embodiments, the frame 12 acts as a storage portion that includes one or more vehicle components. The frame 12 may be formed by two or more frame rails, 72, 74 (shown in further detail in FIG. 6) running the length of the frame 12 and may further include one or more supports extending laterally between the two or more frame rails 72, 74. The frame 12 may include an enclosure that contains one or more vehicle components and/or a frame that supports one or more vehicle components. By way of example, the frame 12 may contain or include one or more electrical storage devices (e.g., batteries, capacitors, etc.). By way of another example, the frame 12 may include fuel tanks. By way of another example, the frame 12 may include a hydraulic tank 90, as depicted in greater detail below with reference to FIGS. 3 and 4. As discussed in greater detail below, however, the systems and methods described herein may allow for the hydraulic tank 90 to be positioned elsewhere on the vehicle 10, such as the body 14, or removed entirely from the vehicle 10.

Figure 2:
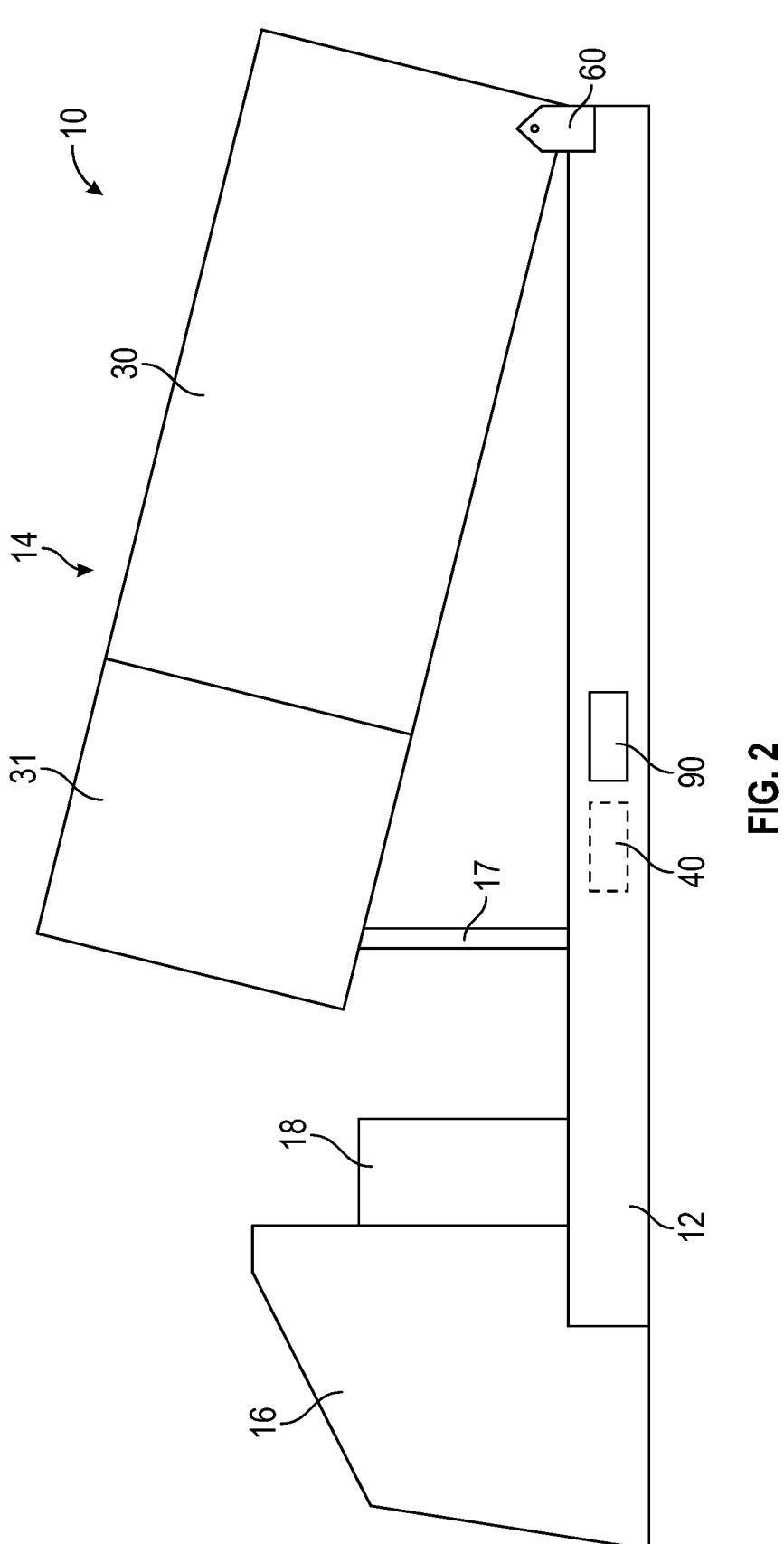
FIG. 2 is a side view of a refuse vehicle with a lifted body, according to some embodiments.

Referring now to FIG. 2, the vehicle 10 is shown with the body 14 lifted by one or more hydraulic cylinders forming a service lift, shown as lift cylinder 17. Further, an electrical storage and/or generation system 40 (e.g., a battery, a generator, etc.) and a hydraulic tank 90 are shown coupled to, or supported by, the frame 12. The electrical storage and/or generation system 40 may be configured to provide power to the various electrical components of the vehicle 10, including, but not limited to, the lift cylinder 17, electric components of the body 14, and/or the electric motor 18. The hydraulic tank 90 may be configured to provide fluid to, and receive fluid from (e.g., provide hydraulic power to), the lift cylinder 17 in operation. The lift cylinder 17 is coupled to and extends between the body 14 and the frame 12. As described in greater detail below, the lift cylinder 17 may generally be positioned within, and extend from, the body

14. The lift cylinder 17 is positioned forward of the pivot assembly 60 and rearward of the cab 16. In some embodiments, the lift cylinder 17 can be used to apply an upward force to lift the body 14 relative to the frame 12 (e.g., when performing maintenance) and pivot the body 14 relative to the frame about the pivot assembly 60. Of course, in operation as described in greater detail below, the lift cylinder 17 may apply a downward force upon the frame 12 that results in the lifting of the body 14 relative to the frame 12. In some embodiments, an upper portion of the lift cylinder 17 is coupled to the body 14 and a lower portion of the lift cylinder is coupled to the frame 12, as depicted in greater detail below with reference to FIG. 4.

According to an exemplary embodiment, the energy storage and/or generation system 40 is configured to (a) receive, generate, and/or store power and (b) provide electric power to (i) the electric motor 18 to drive the wheels 22, (ii) electric actuators of the refuse vehicle 10 (e.g., located on the body 14 or the frame 12) to facilitate operation thereof (e.g., lift actuators, tailgate actuators, packer actuators, grabber actuators, etc.), (iii) the lift cylinder 17, and/or (iv) other electrically operated accessories of the refuse vehicle 10 (e.g., displays, lights, etc.). The energy storage and/or generation system 40 may include one or more rechargeable batteries (e.g., lithium-ion batteries, nickel-metal hydride batteries, lithium-ion polymer batteries, lead-acid batteries, nickel-cadmium batteries, etc.), capacitors, solar cells, generators, power buses, etc. In one embodiment, the refuse vehicle 10 is a completely electric refuse vehicle. In other embodiments, the refuse vehicle 10 includes an internal combustion generator that utilizes one or more fuels (e.g., gasoline, diesel, propane, natural gas, hydrogen, etc.) to generate electricity to charge the energy storage and/or generation system 40, power the electric motor 18, power the electric actuators, and/or power the other electrically operated accessories (e.g., a hybrid refuse vehicle, etc.). For example, the refuse vehicle 10 may have an internal combustion engine augmented by the electric motor 18 to cooperatively provide power to the wheels 22. The energy storage and/or generation system 40 may thereby be charged via an on-board generator (e.g., an internal combustion generator, a solar panel system, etc.), from an external power source (e.g., overhead power lines, mains power source through a charging input, etc.), and/or via a power regenerative braking system, and provide power to the electrically operated systems of the refuse vehicle 10. In some embodiments, the energy storage and/or generation system 40 includes a heat management system (e.g., liquid cooling, heat exchanger, air cooling, etc.).

In some embodiments, the vehicle 10 includes a pivot assembly 60 configured to facilitate rotatable movement of the body 14 relative to the frame 12. The pivot assembly 60 pivotally couples the frame 12 to the body 14, such that the body 14 is rotatable relative to the frame 12 about a lateral axis formed by a cross-bar, depicted in greater detail below with reference to FIG. 6. The pivot assembly 60 is configured to facilitate free movement of the body 14 relative to the frame 12 caused by the lift cylinder 17.

Figure 3:
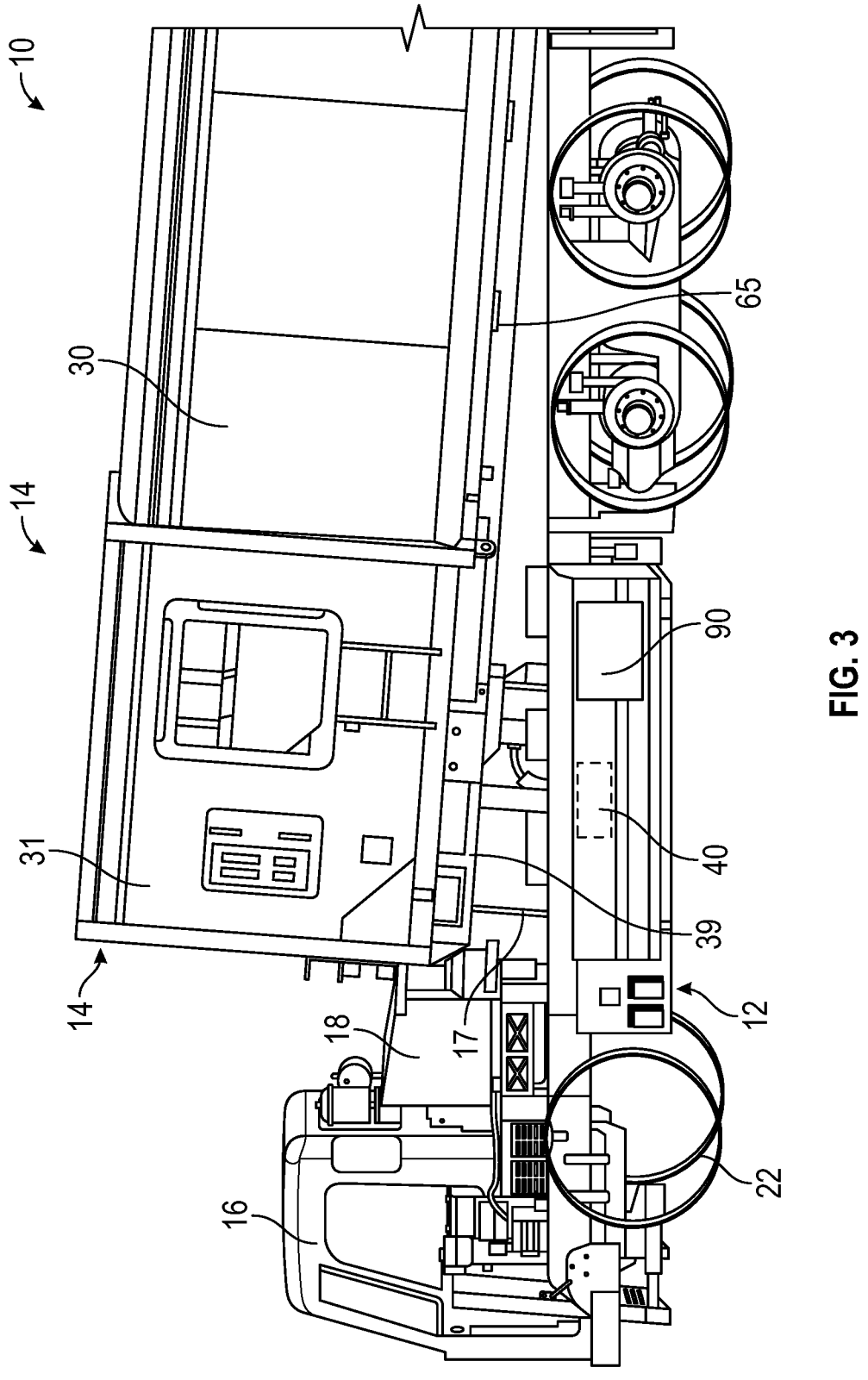
FIG. 3 is a detailed view of the refuse vehicle with a lifted body of FIG. 2, according to some embodiments.

Referring now to FIG. 3, the body 14 of the vehicle 10 is depicted being lifted by the lift cylinder 17 in greater detail, according to some embodiments. As shown, the body 14 may be lifted by the lift cylinder 17 over the frame 12. The body 14 may be lifted in order to perform maintenance on the vehicle 10. For example, lifting the body 14 may facilitate maintenance of components beneath the body 14 (such as components stored on a lower portion of the body 14), forward of the body 14, and/or on or within the frame 12. As shown, the lift cylinder 17 may generally be located within the body 14 in some embodiments. In other embodiments, the lift cylinder may be more specifically located within the hopper volume 31 and extend downward from the hopper volume 31 to interface with the frame 12.

Figure 4:
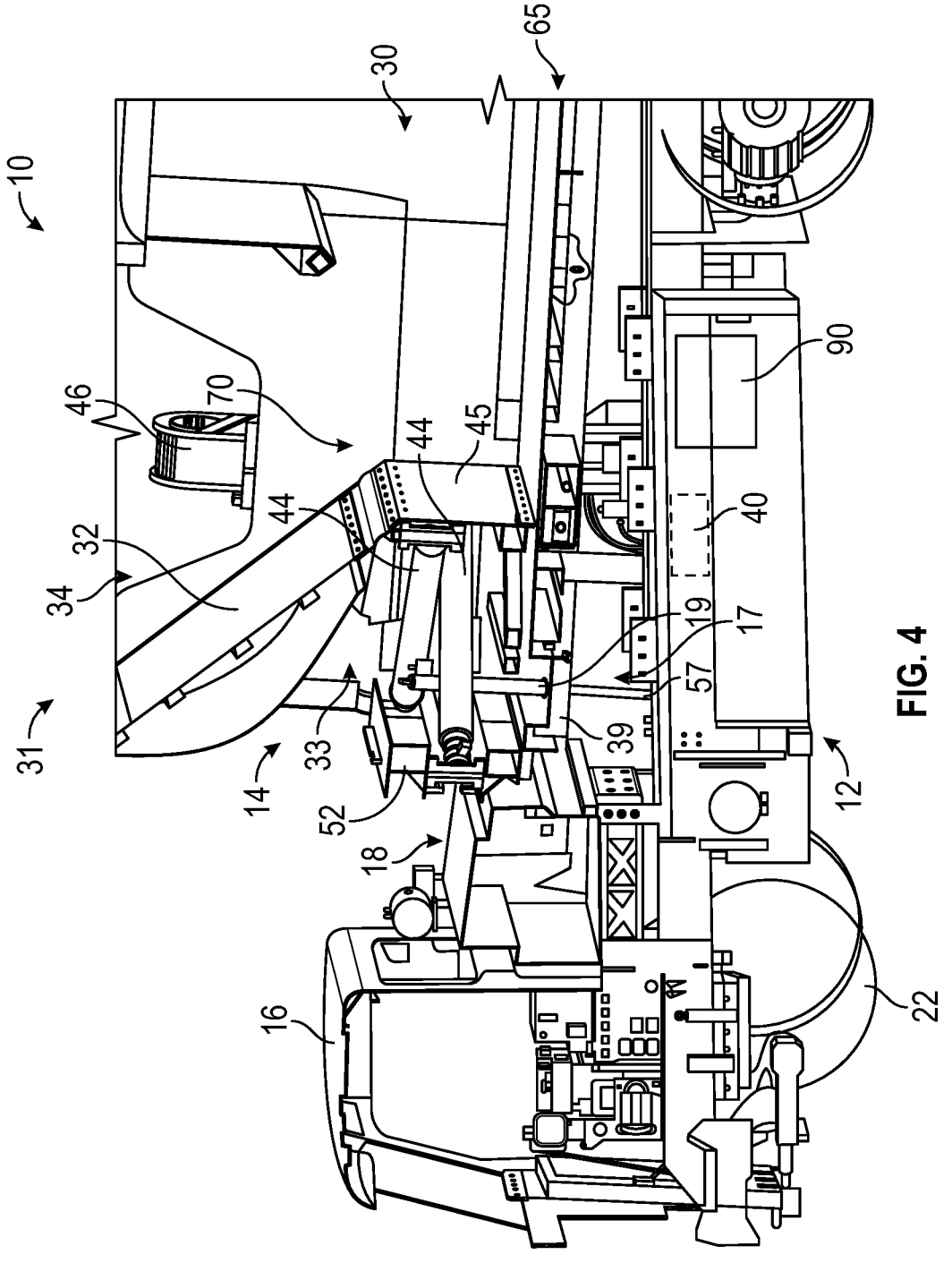
FIG. 4 is a cross-sectional view of the refuse vehicle with a lifted body of FIG. 2, according to some embodiments.

Referring now to FIG. 4, a more detailed depiction of the vehicle 10 being lifted by the lift cylinder 17 is shown, according to some embodiments. The lift cylinder 17 includes a first end 57 (e.g., a frame end, an actuator rod, etc.) coupled to the frame 12, and a second end 19 (e.g., a body end, a base portion, a cylinder base, a cylinder body, etc.) coupled the body 14 (via the base 65 of the body 14). The second end 19 of the lift cylinder 17 may be coupled to the body and extend into the hopper volume 31, behind the ram 45 (e.g., ejector) of the packer system 70. The hopper volume 31 may include an upper opening 34 (e.g., a hopper opening) into which material (e.g., refuse) can be inserted for compacting and storage in the body 14. The hopper volume 31 may include an angled hopper loading surface 32 configured to direct the material (e.g., refuse, debris, etc.) inserted into the upper opening 34 towards the storage volume 30, so that the ram 45 can compress the material and push the material toward the storage volume 30. The lift cylinder 17 may be positioned underneath the hopper loading surface 32 and between the head wall 52, the ram 45, and the side walls of the body 14 for protection from the materials. This area may be defined as an actuator volume 33 of the hopper volume 31. The first end 57 of the lift cylinder 17 is configured to move relative to the second end 19. The first end 57 of the lift cylinder 17 is rotatably coupled to an upper surface of the frame 12 to facilitate the lifting methods disclosed herein. Thus, as suggested above, the second end 19 may be disposed within the hopper volume 31 and the first end 57 may extend downward from the body 14 to interface with the frame 12. The first end 57 may interface with the frame 12 on an upper surface of the frame 12 (e.g., an upper surface of either of two frame rails 72, 74 forming the frame 12, a support extending between the two frame rails 72, 74 forming the frame 12, etc.). In operation the lift cylinder 17 extends (e.g., the first end 57 moves away from the second end 19) as the body 14 moves upward relative to the frame 12. Similarly, the lift cylinder 17 retracts (e.g., the first end 57 move towards the second end 19) as the body 14 moves downward relative to the frame 12. Thus, in some embodiments, the lift cylinder 17 operates to push down on the frame 12 in order to lift and/or pivot the body 14 relative to the frame 12.

In some embodiments, the first end 57 extends at least partially into a cavity formed within the second end 19. In particular, the lift cylinder 17 may be coupled to the body 14 via a surface 39 (e.g., a lower surface) of the base 65. The surface 39 may be positioned forward of the refuse compartment 30 in the hopper volume 31. The second end 19 may disposed within, or rigidly coupled to, the surface 39. In this sense, when the lift cylinder 17 is operated to extend the first end 57 away from the second end 19, the lift cylinder acts to exert a downward force against the frame 12. The first end 57 may extend through an opening in the lower surface 39. Due to the rigid coupling of the lift cylinder 17 to the surface 39 (and thus the body 14, in general), the body 14 may be lifted. Accordingly, the lift cylinder 17 can control the relative position of the body 14 and the frame 12. As suggested above, such an arrangement of the lift cylinder 17 (e.g., coupled to an upper surface of the frame 12 and disposed within the hopper volume 31), valuable space on the frame 12 (e.g., on the sides of the frame 12, within the frame 12, etc.) may be advantageously conserved as opposed to various other systems.

In some embodiments, the lift cylinder 17 is a hydraulic cylinder. By way of example, if hydraulic fluid were added to a chamber within the second end 19, the lift cylinder 17 would extend and raise the body 14. If hydraulic fluid were allowed to be released from the chamber within the second end 19, the lift cylinder 17 would retract and lower the body 14. The provision and removal of hydraulic fluid from the lift cylinder 17 may be facilitated by the hydraulic tank 90. Thus, the amount of fluid in each lift cylinder 17 may be varied by an operator to raise or lower the body 14. While the hydraulic tank 90 is depicted as coupled to or supported by the frame 12, positioning the lift cylinder 17 within the body 14 as shown may allow for repositioning the hydraulic tank 90 within the body 14, in some embodiments. Moreover, in some embodiments, the lift cylinder 17 is an electric (e.g., electromechanical) actuator powered by the energy storage and/or generation system 40. By way of example, electrical power supplied to the lift cylinder 17 by the electrical storage and/or generation system 40 may allow the lift cylinder to extend and retract as described above. Thus, in some embodiments, the hydraulic tank 90 may be removed from the vehicle 10 entirely. Either repositioning the hydraulic tank 90 within the body 14 or removing the hydraulic tank 90 entirely (in embodiments where the lift cylinder 17 is an electrical actuator) may further provide additional space for other components along the frame 12.

In some embodiments, a compactor, shown as packer system 70 (e.g., press, compactor, packer, etc.), is positioned within the body 14. Specifically, the packer system 70 may be positioned within the hopper volume 31. According to an exemplary embodiment, packer system 70 is configured to compact the refuse within the hopper volume 31 of the body 14 into the storage volume 30 of the body 14 thereby increasing the carrying capacity of the vehicle 10. In some embodiments, packer system 70 utilizes hydraulic power provided by the hydraulic tank 90 to compact the refuse from the hopper portion into the storage portion. In other embodiments, the packer system 70 utilizes electric power supplied, as an example, by the energy storage and/or generation system 40.

Figure 5:
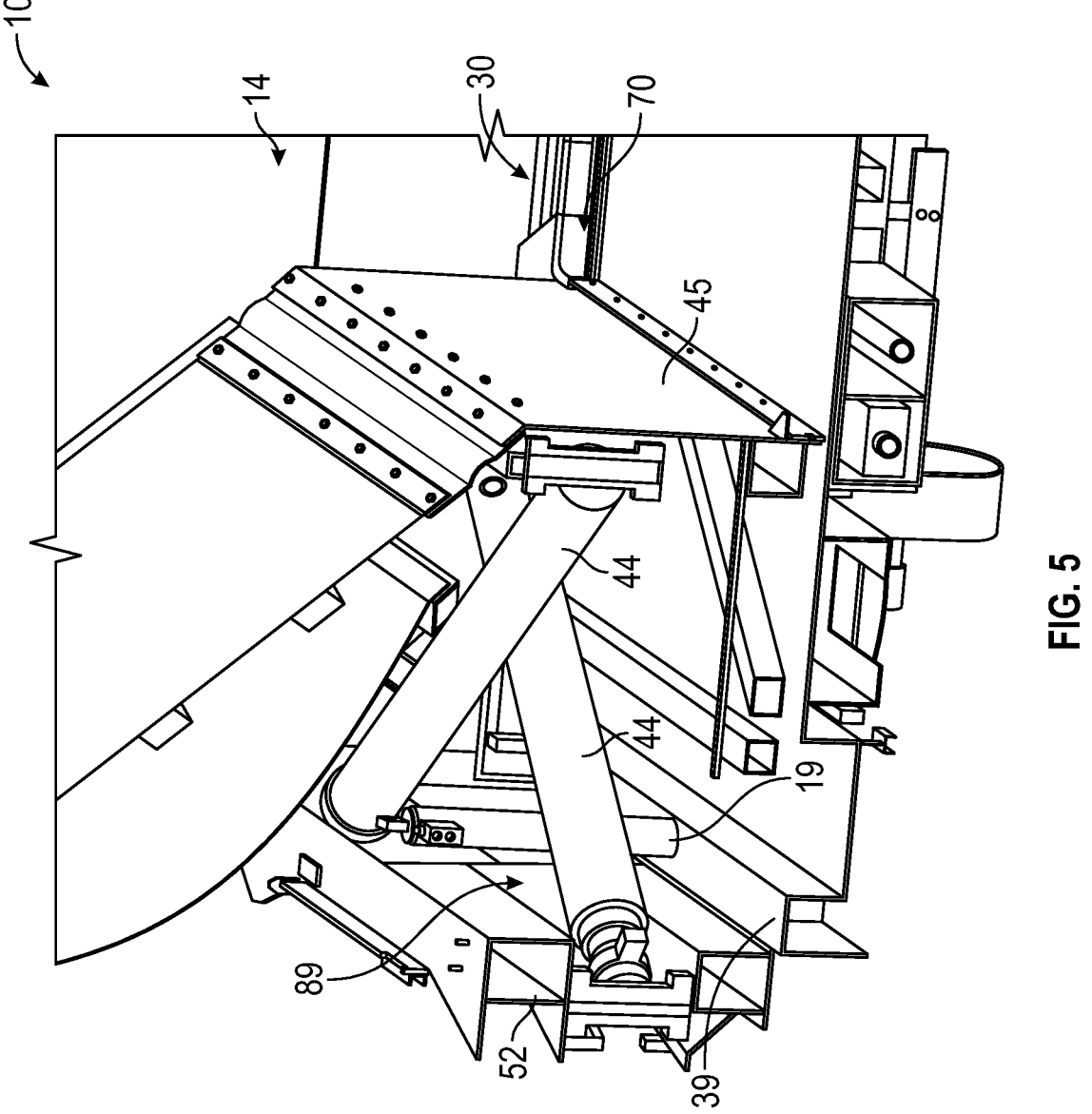
FIG. 5 is a detailed view of the packer system of the refuse vehicle of FIG. 1, according to some embodiments.

Referring now to FIG. 5, the packer system 70 is shown in greater detail, according to some embodiments. The packer system 70 includes a ram, shown as ejector 45, and actuators, shown as hydraulic cylinders 44. As shown, the lift cylinder 17 may be generally located within the packer system 70 and forward of the ejector 45. Hydraulic cylinders 44 are coupled at their respective first ends to ejector 45 and at their respective second ends to a frame member of body 14, shown as head wall 52. The hydraulic cylinders may thus be positioned within the actuator volume 33 and enclosed by the head wall 52, the side walls of the body 14, a lower surface 39 of the body, the ejector 45, and the hopper loading surface 32. Head wall 52 is positioned along the cab 16 of the refuse vehicle, according to an exemplary embodiment. According to an exemplary embodiment, the head wall 52 is a lightweight structure coupled to various lower frame members of body 14. The head wall 52 may extend to the top of the body 14 or may be coupled to or part of a wall that extends to the top of the body 14, where it may be coupled to the upper end of the hopper loading surface 32. While depicted as generally disposed within the hopper volume 31, the hydraulic cylinders 44 may alternatively be disposed within a cavity formed below the body 14 (and/or hopper volume 31), above the body 14, or extend from the frame 12 into the body 14 to compact the refuse within the hopper volume 31 as described herein.

As shown, hydraulic cylinders 44 are positioned to extend ejector 45 rearward away from head wall 52. The hydraulic cylinders 44 may be positioned to form an "X" shape when viewed from above. According to an exemplary embodiment, hydraulic cylinders 44 may extend diagonally such that the first end is coupled to the ejector 45 at a first lateral side of body 14 and the second end is coupled to an opposite lateral side of ejector 45. For example, a first hydraulic cylinder 44 may be coupled to a left side of a first wall of the body 14 (e.g., the head wall 52) and to a right side of the ejector 45, and a second hydraulic cylinder 44 may be coupled to a right side of the first wall and a left side of the ejector 45. Thus, when viewed from above, the two hydraulic cylinders 44 and the head wall 52 may substantially form a triangle. The lift actuator 17 may extend through the triangle. The first end may be coupled to the ejector 45 with a first pivoting bracket and the second end may be coupled to the ejector with a second pivoting bracket. In some embodiments, hydraulic cylinders 44 each include a first end coupled to one of the corners formed by the head wall 52 and a second end coupled to ejector 45. According to an alternative embodiment, packer system 70 includes hydraulic cylinders 44 that extend longitudinally along a length of body 14, parallel to each other and not forming an "X". For example, two hydraulic cylinders 44 may be arranged such that the head wall, the ram, and the two packer actuators substantially form a rectangle when viewed from above, wherein the lift actuator extends through the rectangle. According to still other embodiments, packer system 70 includes a single actuator or another device to slide ejector 45 along the body 14. In some embodiments, the hydraulic cylinders 44 may instead be electric (e.g., electromechanical) actuators. In some embodiments, the vehicle 10 may be fully electric and may not include a hydraulic system. Any or all of the actuators in the vehicle 10 may be electromechanical actuators.

In some embodiments, and as shown, the hydraulic cylinders 44 may be arranged to form a roughly triangular (as seen from above) cavity 89 extending upwardly from the surface 39 between the head wall 52 and the hydraulic cylinders 44. The lift cylinder 17 may be coupled to the surface 39 such that the lift cylinder 17 (and the second end 19 of the lift cylinder, particularly) is positioned substantially within the cavity 89 formed by the "X" arrangement of the hydraulic cylinders 44 near the head wall 52.

Figure 6:
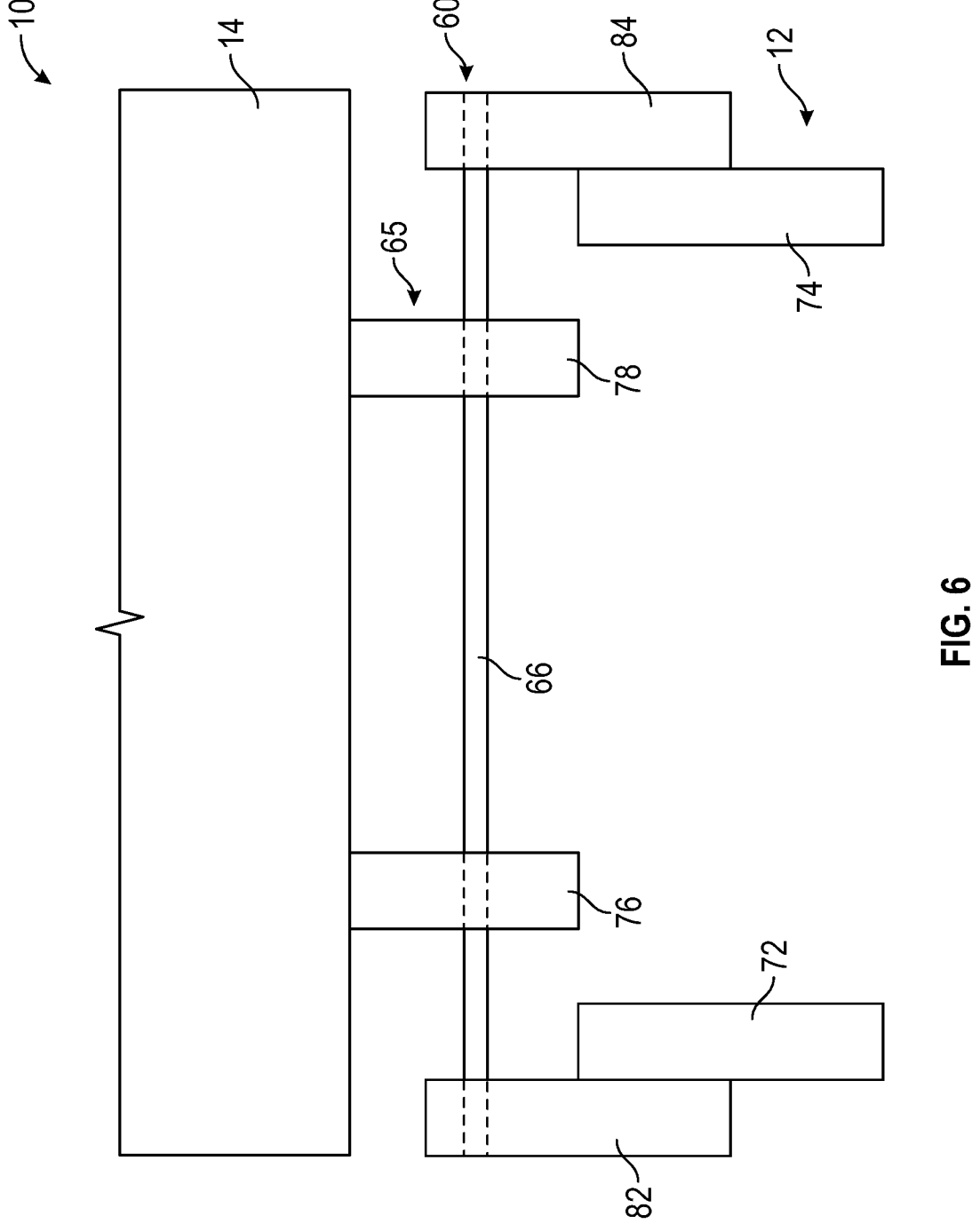
FIG. 6 is a rear view of the refuse vehicle of FIG. 1, according to some embodiments.

Referring now to FIG. 6, the pivot assembly 60 of the vehicle 10 is shown from a rear perspective of the vehicle 10. As shown, the frame 12 includes two separate rails 72, 74 as shown. The base 65 may also form a pair of separate rails 76, 78, as shown. In other embodiments, the base 65 is a solid member filling the entire cavity depicted between the separate rails 76, 78 depicted as the base 65. A cross-bar 66 may run laterally between two members 82, 84 of the pivot assembly 60 to facilitate the rotatable coupling of the body 14 to the frame 12. Thus, in some embodiments, when the body 14 is lifted relative to the frame 12, a portion of the weight of the body 14 (that is not supported by the lift cylinder 17) is supported via the base 65 being supported by the cross-bar 66, which in turn is supported by the members 82, 84, which in turn are supported by the frame 12 (the two rails 72, 74 of the frame 12, as shown), which are in turn generally supported by the wheels 22.

As described herein, the use of asymmetrical windows to avoid constructive interference or promote destructive interference of reflections may avoid undesirable secondary signal peaks with larger amplitudes than the primary signal peaks. The absence of these larger secondary signals may allow the AGC and threshold-based peak detection algorithms to operate with precision and accurately identify the leading-edge signal.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (i.e., permanent or fixed) or moveable (i.e., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (i.e., directly coupled), the generic definition of "coupled" provided above is modified by the plain language meaning of the additional term (i.e., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (i.e., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure.

It is important to note that the construction and arrangement of the apparatus as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A vehicle comprising:
a chassis;
a body pivotally coupled to the chassis by a pivot assembly and comprising a head wall, a hopper volume, and a storage volume;
a ram disposed at least partially within the hopper volume and coupled to a first end of each of two packer actuators configured to cause a substantially vertical surface of the ram to compact and push material loaded into the hopper volume toward the storage volume, the two packer actuators arranged such that the head wall and the two packer actuators substantially form a triangle when viewed from above; and
a lift actuator comprising a base portion extending through the triangle and an actuator rod extending from the body and coupled to the chassis, such that the lift actuator is configured to lift and pivot the body relative to the chassis.

2. The vehicle of claim 1, wherein the hopper volume comprises a hopper loading surface configured to direct material loaded into the hopper volume toward the storage volume, wherein the lift actuator is positioned under the hopper loading surface.

3. The vehicle of claim 2, wherein the two packer actuators are positioned under the hopper loading surface.

4. The vehicle of claim 2, wherein the hopper loading surface extends to an upper edge of the substantially vertical surface of the ram.

5. The vehicle of claim 4, wherein the hopper loading surface extends from a left side wall of the body to a right side wall of the body.

6. The vehicle of claim 1, further comprising a battery coupled to the chassis, wherein the lift actuator and the two packer actuators are electromechanical actuators electrically coupled to and configured to be powered by the battery.

7. The vehicle of claim 1, further comprising a battery coupled to the chassis, wherein the lift actuator is an electromechanical actuator electrically coupled to and configured to be powered by the battery.

8. The vehicle of claim 1, wherein the base portion of the lift actuator is a hydraulic cylinder body.

9. The vehicle of claim 8, wherein the hydraulic cylinder body is coupled to a lower surface of the body of the vehicle, and the actuator rod extends through an opening in the lower surface.

10. A refuse vehicle comprising:
a chassis;
a body comprising a head wall, a storage volume, and a hopper volume configured to receive refuse via an upper opening and a storage volume configured to store the refuse, the body pivotally coupled to the chassis by a pivot assembly;
an ejector disposed within the hopper volume, the ejector comprising a substantially vertical surface configured to compact and push material loaded into the hopper volume toward the storage volume;
a first packer actuator coupled to a left side of the head wall and a right side of the ejector;
a second packer actuator coupled to a right side of the head wall and a left side of the ejector, the first and second packer actuators forming an "X" shape when viewed from above; and
a lift actuator extending through a triangle formed by the head wall, the first packer actuator, and the second packer actuator, the lift actuator comprising a base portion positioned within the hopper volume and an actuator rod extending from the hopper volume and coupled to the chassis, such that the lift actuator is configured to lift and pivot the body relative to the chassis.

11. The refuse vehicle of claim 10, wherein the hopper volume includes an actuator volume defined by the head wall, two side walls of the body, a lower surface of the body, the ejector, and a hopper loading surface configured to direct refuse loaded into the upper opening toward the storage volume, wherein the lift actuator and the first and second packer actuators are enclosed within the actuator volume.

12. The refuse vehicle of claim 11, wherein the hopper loading surface extends to an upper edge of the substantially vertical surface of the ejector.

13. The refuse vehicle of claim 12, wherein the hopper loading surface extends from a left side wall of the body to a right side wall of the body.

14. The refuse vehicle of claim 10, further comprising a battery coupled to the chassis, wherein the lift actuator is an electromechanical actuator electrically coupled to and configured to be powered by the battery.

* * * * *